United States Patent
Stirpe et al.

[11] Patent Number: 5,805,578
[45] Date of Patent: Sep. 8, 1998

[54] AUTOMATIC RECONFIGURATION OF MULTIPOINT COMMUNICATION CHANNELS

[75] Inventors: Paul Alan Stirpe, Port Washington; Dinesh Chandra Verma, Ossining, both of N.Y.; Stephen Joseph Nadas, Raleigh, N.C.; Manish Gupta, Croton-on-Hudson, N.Y.; Elizabeth A. Hervatic, Cary, N.C.

[73] Assignee: International Business Machines Corporation, Armonk, N.Y.

[21] Appl. No.: 614,421
[22] Filed: Mar. 12, 1996

Related U.S. Application Data

[60] Provisional application No. 60/005,927, Oct. 27, 1995.
[51] Int. Cl.$^6$ .................................................. H04L 12/44
[52] U.S. Cl. ...................... 370/255; 370/408; 395/182.02
[58] Field of Search .................................... 370/216, 255, 370/256, 257, 400, 408, 351; 395/182.01, 182.02

[56] References Cited

U.S. PATENT DOCUMENTS

5,355,371 10/1994 Auerbach et al. ...................... 370/255
5,522,046 5/1996 McMillan ............................ 395/200.15
5,581,543 12/1996 Natarajan ................................ 370/221

*Primary Examiner*—Min Jung
*Attorney, Agent, or Firm*—Douglas W. Cameron

[57] ABSTRACT

A method of reconfiguring a multipoint communications channel to reconnect selected nodes after failures occur in the network disclosed. The method for this invention requires that a selected node (leader) participating in the multipoint communication channel act as the coordinator of the re-establishment protocol. The coordinator (leader) monitors the state of network topology to determine failures, recomputes an alternative feasible communication channel path in the case of failure, and generates messages to join new network elements in the multipoint communication channel. By using a novel tree recomputation method that rejoins the disconnected subtrees created by the network failure to the tree containing the coordinator, along with network topology information, the coordinator is able to minimize messaging and preserve the original channel to the maximum possible extent. The invention can be practiced in a network which provides quality-of-service characteristics to multipoint connections, by ensuring that the recomputation of the multipoint communication channel preserves the quality-of-service of the original connection.

12 Claims, 6 Drawing Sheets

LEADER
PARTICIPANT
TRANSIT NODE

AUTOMATIC RECONFIGURATION OF MULTIPOINT COMMUNICATION CHANNELS

CROSS-REFERENCE TO RELATED APPLICATION

The present application claims priority to co-pending U.S. provisional application Ser. No. 60/005,927. Filed on: Oct. 27, 1995.

TECHNICAL FIELD

The invention relates to the field of computer networks, particularly to multipoint communications, and realizing fault-tolerant multipoint communication in computer networks.

DESCRIPTION OF THE PRIOR ART

A computer network consists of a plurality of nodes interconnected by a plurality of links. The nodes consist of processing elements that perform switching of data in the network. Communication in such a network can be classified broadly into two classes, connection-less and connection-oriented. A connection-oriented network requires the establishment of a physical or logical connection in the network before data communication can be initiated, while a connection-less network does not have such a requirement. The Internet is an example of a connection-less network, while networks based on upcoming Asynchronous Transfer Mode technology are connection-oriented. Our invention is applicable to the area of connection-oriented networks.

A communication channel in a computer network is a logical connection established between two or more communicating entities that may traverse a subset of the nodes and links in the computer network. A communicating entity is usually present at a node, or has an agent acting on its behalf present at a node. A communication channel usually requires that some resources be reserved for it at each node and link that it traverses. Resources reserved for a communication channel may include, among other things, bandwidth on the links, buffers at the nodes, and address labels. A communication channel can be classified as point-to-point or multipoint (point-to-point communication channels have only two end points, while multipoint communication channels have multiple end-points).

When a link or node in the network fails, the connectivity of a communication channel is disrupted. Typically, the multipoint communication channel needs to be re-established in order for communication to continue. Usually, for point-to-point communication channels, the disrupted communication channel is taken down in its entirety, an d a new channel re-established for continued connectivity. The take-down and re-establishment of the network resources requires sending messages to the involved nodes. Such a method allows communication to continue in the presence of failures, and provides fault-tolerance. This method is known as non-disruptive path switching for point-to-point connections in the context of IBM 2220 Nways broadband switches [2].

Fault-tolerance is a highly desirable property for multipoint communication channels. However, the number of n odes and links involved in a multipoint communication channel is usually large, and the above-mentioned scheme of taking down the failed communication channel in its entirety, and establishing a new communication channel would require a large number of messages.

U.S. Pat. No. 5,093,824 describes a method for fault tolerant communication in which all possible failure modes of the net work are pre-computed, and alternate paths for communication channels pre-computed for each of the failure situations. This method has been applied successfully to telecommunication networks, where the number of alternative paths to be taken is limited. In a computer network with a large number of communication channels, pre-computation of all possible alternate topologies for each channel for each possible failure situation would be impractical.

U.S. Pat. No. 5,027,342 describes a method for fault tolerant communication in a local-area network whereby multiple hub nodes are introduced among different sections of a local-area network. The hub nodes have redundant hardware paths connecting the sections, and on the failure of one path, connectivity is restored via another path in the hub node itself. This enables the network to reconfigure itself and to restore connectivity.

U.S. Pat. No. 5,020,059 describes a way for reconfiguring a distributed multiprocessor computing system in the presence of failure. The same paradigm can be extended to the case of a computer network to restore connectivity in the presence of failures. However, the approach does not teach fault-tolerance for communication channels themselves, which only traverse a subset of the network. Instead, the patent requires full utilization of all operable processing units (nodes) in the multipoint computing system. Furthermore, the patent requires that the multipoint computing system always utilize a tree of minimum depth.

U.S. Pat. No. 5,259,027 describes a way for restoring digital circuits by using a central access controller in a public digital telephone network. The same paradigm, when extended to a computer network, requires a central node to manage reconfiguration for all the multipoint communication channels in the network. Such an approach has severe performance implications, and does not provide fault-tolerance when the central node fails.

U.S. Pat. Nos. 5,027,342 and 5,020,059 (extended) provide a reconfiguration method to ensure connectivity for point-to-point connections by restoring, to a limited extent, physical connectivity between network elements. Typically, there is a physical path in the network from each node to every other node. When a failure occurs, some of the network nodes may no longer have a physical path between them. By reconfiguring some of the network elements, it may be possible to restore physical connectivity between all nodes in the network. In a circuit-switched network, such a reconfiguration is not sufficient to restore the digital circuits. One needs to re-establish the failed communication channels by explicit signaling or other methods, to quickly, and with minimal disruption to communicating end-points, re-establish the communication channel. The IBM NBBS architecture describes a method to provide this restoration for point-to-point communication in an integrated packet-switching network [2]. The invention disclosed here provides fault-tolerance for multipoint communication channels in an integrated packet-switching network. There is therefore a need for an efficient method for reconfiguring a multipoint communication channel in the event of network failures.

SUMMARY OF THE INVENTION

An object of the invention is to increase the fault-tolerance of multipoint communication channels in a computer network, by reconfiguring them in the presence of failures.

Another object of the invention is to maximally preserve the old communication channel during the reconfiguration process.

Another object of the invention is to minimize the number of messages sent on the communication network during the reconfiguration process.

Another object of the invention is to perform the reconfiguration with minimum disruption to the communicating end-points.

Another object of the invention is to perform the reconfiguration while satisfying the overall parametric constraints of the multipoint communication channel.

The method of this invention presents a source-centric method for the automatic reconfiguration of a multipoint communication channel while preserving as much of the original configuration as possible, reclaiming reserved resources that are no longer needed by the multipoint communication channel, and all with minimal disruption to the end-point users of the multipoint communication channel.

The method for this invention requires that a selected node (leader) participating in the multipoint communication channel act as the coordinator of the reestablishment protocol. The coordinator (leader) monitors the state of network topology to determine failures, recomputes an alternative feasible communication channel path in the case of failure, and generates messages to join new network elements in the multipoint communication channel. By using a novel tree recomputation method that rejoins the disconnected subtrees created by the network failure to the tree containing the coordinator, along with network topology information, the coordinator is able to minimize messaging and preserve the original channel to the maximum possible extent. The invention can be practiced in a network which provides quality-of-service characteristics to multipoint connections, by ensuring that the recomputation of the multipoint communication channel preserves the quality-of-service of the original connection.

DESCRIPTION OF THE PREFERRED EMBODIMENT

One of the nodes involved in the multipoint communication channel is identified as the leader node or simply the leader. The leader is responsible for establishing the multipoint communication channel, detecting failures in the network, determining if the failure impacts the multipoint communication channel, and reconfiguring the multipoint communication channel, if necessary. The nodes that have an entity participating in the multipoint communication are referred to as participant nodes or simply as participants. Usually the leader is a participant as well. The multipoint communication channel consists of the leader node, the participant nodes, and several transit nodes. The transit nodes do not have an entity participating in multipoint communication, but are required to permit connectivity between the leader and the other participants. Different multipoint communication channels may have different leaders.

Figure 1:
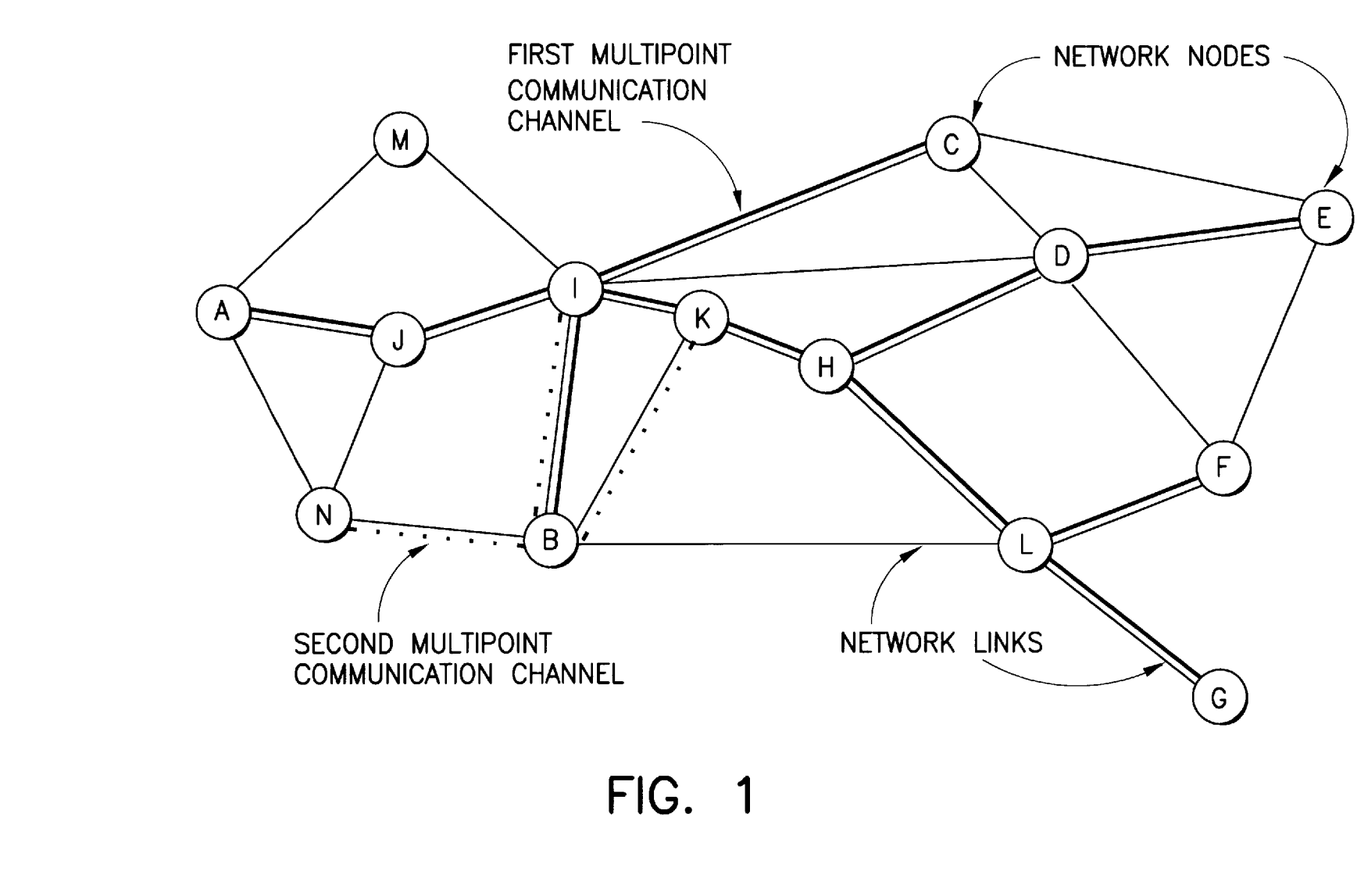
FIG. 1 shows an example of a communication network and two multipoint communication channels in it, one communication channel between nodes A, J, I, B, K, C, H, D, E, L, F, and G, and the other between nodes N, B, I and K.

FIG. 1 shows a communication network whose links are designated by the thin lines, and two multipoint communication channels designated by the thick and dashed lines, respectively. The first multipoint communication channel utilizes nodes A, J, I, B, K, C, H, D, E, L, F, and G. The second communication channel utilizes nodes B, N, I and K.

It is known from prior art that multipoint communication channels must utilize the topology of a tree for the most efficient usage of the network resources. In a tree, there is one unique path between any two nodes (leader, participant, or transit node) involved in a communication channel. Furthermore, all leaf nodes (i.e. a node which does not lie within the path between the leader and any other node) must be a participant node.

A multipoint communication channel may have parametric constraints associated with it. For example, there can be an upper bound constraint on the end-to-end delay from the leader to any participant, or an upper bound on the maximum permitted packet loss on the multipoint communication channel. These parametric constraints are met by reserving resources at the nodes and links participating in the multipoint communication channel. Each network element has a parametric characteristic, such as the bandwidth available on the link, or the amount of delay that is encountered by a communication channel traversing that network element. In order to meet the parametric constraints of the multipoint communication channel, the network elements chosen for the multipoint communication channel must have parametric characteristics that satisfy the parametric constraints for the multipoint communication channel. For example, if a channel requires a bandwidth B, only links with available bandwidth exceeding or equal to B could be chosen to participate in the multipoint communication channel. In a channel whose end-to-end delay from the leader to any participant is constrained to be less than D, only those combinations of nodes and links, where the total end-to-end delay is less than or equal to the constraint D of the multipoint communication channel, can be chosen.

The parametric constraints for multipoint communication channels are specified in terms of the requirements of the multipoint communication channel, and the characteristics of the nodes and links participating in the multipoint communication channel. The invention is applicable for any parameter ρ for which two operations ⊕ and ≦ can be defined with the following semantics:

If a connection has a parametric requirement ρ1 and a network element (link, node, or a combination of links and nodes) has parametric characteristics of ρ2 then ρ1 ≦ρ2 is true if and only if the network element ρ2 can support the connection with the required characteristics.

If two network elements have parametric characteristics ρ1 and ρ2, then the network element formed by combining the two elements have the parametric characteristic of ρ1⊕ρ2.

The parametric constraints can be used to provide Quality of Service (QOS) support to multipoint communication channels. As a particular example, consider δ, ε and β as the set of parametric constraints for the QOS requirement of a connection specified in terms of the tuple <δ,ε,β> where δ specifies the maximum end-to-end delay, ε specifies the maximum end-to-end link error rate on the connection, and β specifies the bandwidth requirement of the connection. The QOS characteristic of a network element (e.g. link) is specified as a similar tuple <δ1,ε1,β1> δ1 being the delay on the link, ε1 being the error rate of the link, and β1 being the available bandwidth on the link, then the two operations can be defined as the follows:

<δ,ε,β>≦<δ1,ε1,β1>iffδ1≦δ and ε1≦ε and β≦β1.

<δ1,ε1,β1>⊕<δ2,ε2,β2>=<δ1+δ2,1−(1−ε1)*(1−ε2), min(β1,β2)>

The ⊕ operation gives the characteristics of the combining two network elements, while the ≦ operation checks if a given network element can meet the parametric constraints of the connection.

Figure 2:
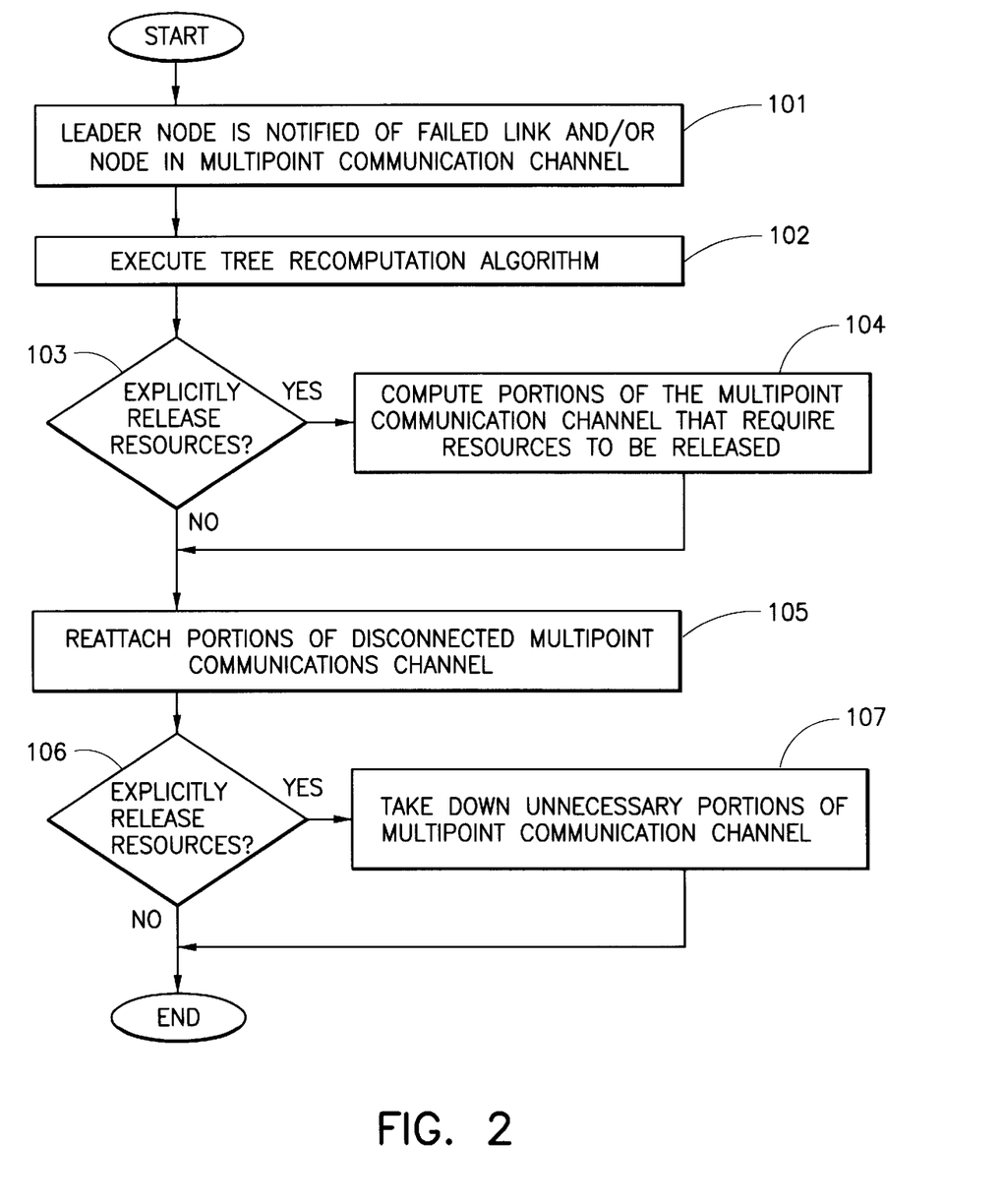
FIG. 2 shows a flow chart representation of the disclosed reconfiguration algorithm.

The reconfiguration algorithm is illustrated in FIG. 2 and consists of the following steps:

(A) The leader of a multipoint communication channel receives information that a network element (for example a link or node) in the network that is utilized by the multipoint communication channel has failed. This information is supplied by any entity that is monitoring network links and nodes (See 101 in FIG. 2).

(B) It computes new paths in the network which can be used to reattach those portions of the multipoint communication channel that became disconnected from the multipoint communication channel as a result of the failure (See 102 in FIG. 2). The paths may optionally be required to meet some specified parametric constraints of the multipoint communication channel.

(C) It (optionally) computes the portions of the multipoint communication channel that require resources to be released (See 103 and 104 in FIG. 2).

(D) It re-establishes the multipoint communication channel by reattaching disconnected portions of the multipoint communication channel (See 105 in FIG. 2).

(e) It (optionally) takes down portions of the multipoint communication channel for resources that are no longer needed by the multipoint communication channel (See 106 and 107 in FIG. 2).

Step (A) in the process is a notification step. The leader can obtain this notification via several methods, e.g. it may actively monitor the status of the network topology distributed by the control flows in the network, or it may register an interest in the status of a set of network elements to some other entity actively monitoring the network topology. The exact method of the notification is not important to this disclosure. As long as a notification method is present, the steps outlined in the disclosure can be executed. In [3], a network architecture is described that provides each node in the network with the status of its network topology.

Step (B) and (C) require the computation of the new topology of the multipoint communication channel. In these steps, the leader determines which resources should be acquired and released in the network. Step (C) is optional, and is needed only when the leader desires to explicitly release some of the network resources by signalling to appropriate network elements. If the network control provides a method by which resources on some links are implicitly released, an explicit release [1-3] may not be required. A method by which resources are implicitly held via a periodic liveness message is described in [1]. As an example, if a periodic liveliness message is required by the network control to maintain the reservation of resources, then the resources can be released implicitly by stopping the periodic liveliness messages. However, explicit release of network resources is typically more efficient because network resources are released more quickly than the implicit method, and are available for use by other network entities.

As a result of the computation, two sets of paths are computed (i) the set of links on which resources need to be released and (ii) the set of links on which resources need to be acquired.

In Steps (D) and (E), the leader of the multipoint communication channel sends take-down request messages to the network entities controlling the link resources in set (i), and sends out establishment request messages to network entities controlling the links in set (ii).

The leader may send the request messages individually to each node in the network which requires resources to be allocated (or released). However, if the underlying network provides multicast support, a single message may be sent to several of the nodes. This latter method is illustrated below.

Messages sent to acquire and release resources in the network may typically arrive at the recipient node in any order and at any time. If the reconfiguration requires that a link be removed from the multipoint communication channel, and that another link be added to it, the message to add the link may arrive before the message to remove the link, even if the latter was transmitted earlier by the leader. Due to such race conditions, cycles could form in the resultant multipoint communication channel. One way to prevent the formation of cycles is to include the set of links to be reclaimed from the multipoint communication channel in messages requesting that links be added to the multipoint communication channel. The method for cycle-avoidance is described in more detail later below.

The algorithm to recompute the multipoint communication channel, and the method to prevent cycles are now described.

TREE RECOMPUTATION ALGORITHM

The computation of the new multipoint communication channel requires that the leader have information about the current state of the network and of the multipoint communication channel. The existing multipoint communication channel is represented by a tree topology spanning some of the nodes in the network. When a link or a node in the network that is utilized by the multipoint communication channel fails, the multipoint communication channel disconnects into several disjoint topologies. It can be shown that each disjoint topology thus formed is also a tree topology (subtree), a degenerate tree topology being defined as a single node itself.

In order to specify the tree recomputation algorithm, we first provide some definitions.

A parametric residue (See ρ1 of FIG. 3) is defined for the root of each tree not containing the leader. The parametric residue is defined to be the most stringent parametric constraint for any path from the root of the tree to a participant in the tree. The parametric constraint for the path is obtained by invoking the ⊕ operator repeatedly on the link and nodes characteristics (in the context of the multipoint connection) that occur along the path. The most stringent parametric constrain would be the one or ones that are most difficult to satisfy.

A parametric limit (See ρ3 of FIG. 3) is defined for each node in a tree with respect to the root of the tree. There is a unique path between the root and each node in its tree. The parametric limit is obtained by combining, via the ⊕ operator, the parametric constraint on each link that is on the unique path from the root to that node.

The algorithm to recompute the multipoint communication channel is described.

(1) the leader determines if any leaves in the tree containing the leader are transit nodes. Any transit node that is a leaf may be trimmed from the tree representation of the multipoint communication channel, and its parent examined. If the parent is also a leaf and a transit node, the parent may also be trimmed. All transit node leafs may be trimmed recursively in this manner until all the leafs in the tree are participants. If this trimming of leaf transit nodes is not performed, the multipoint communication channel would have some nodes where resources are reserved but serve no useful purpose, since they do not lead to any participant node.

(2) For each tree T (See for example FIG. 3) not containing the tree leader, compute a feasible path to connect tree T to the tree S containing the tree leader. One method to find a feasible path is described in the next section "Algorithm to Find Feasible Path to Connect Trees". If the multipoint communication channel specifies parametric constraints, the parametric residue for tree T and the parametric limit from the root of S to all nodes in S are computed.

(3) Tree T and S are joined using the feasible path (See 32, for example, of FIG. 3), if one exists, so that the overall parametric constraints, if specified, of the multipoint communication channel are met.

(4) If no feasible path is found to connect tree T to S, the tree T is split into two or more subtrees. The root of T is removed from the tree representation of the multipoint communication channel, and the merge process (steps 2–4) is applied recursively to all the subtrees thus formed, until either all trees T are joined to S, or no feasible path can be found to join all remaining subtrees to S.

SIGNALING TO RECONFIGURE THE MULTIPOINT COMMUNICATION CHANNEL

Let T0 be the old multipoint communication channel before reconfiguration, and T1 be the new communication channel after reconfiguration. The set of all links that are in T0 and not in T1 need to have resources released, and the set of all links that are in T1 and not in T0 need to have the resources acquired. Releasing a resource consists of the leader node signalling to the node that is managing the resource, to remove the resource from the multipoint communication channel.

The reconfiguration algorithm preserves as much as possible, the original multipoint communication channel so that the signaling used to reconfigure the multipoint communication channel is minimal. The algorithm attempts to reconfigure the multipoint communication by preserving in as much as is possible (maximally preserving), the disconnected subtree or subtrees that resulted from the network element failure.

If explicit signaling were utilized to re-attach each participant in the disconnected trees, the degree of signalling between the leader node and the other participant nodes would be proportional to the number of participant members which reside in all the disconnected trees excluding those in the subtree containing the leader. If each participant in a disconnected tree is explicitly re-attached to the main tree, the origin must send O(N) message flows to the N participant nodes in the disconnected tree in order to reform the multipoint communication channel. However, if a disconnected subtree is preserved, it can be joined to the tree containing the leader using only O(1) message flows. This is accomplished by signalling between the leader and the root node of the disconnected tree. This is the optimal solution in terms of line flows.

ALGORITHM TO FIND FEASIBLE PATH TO CONNECT TREES

Figure 3:
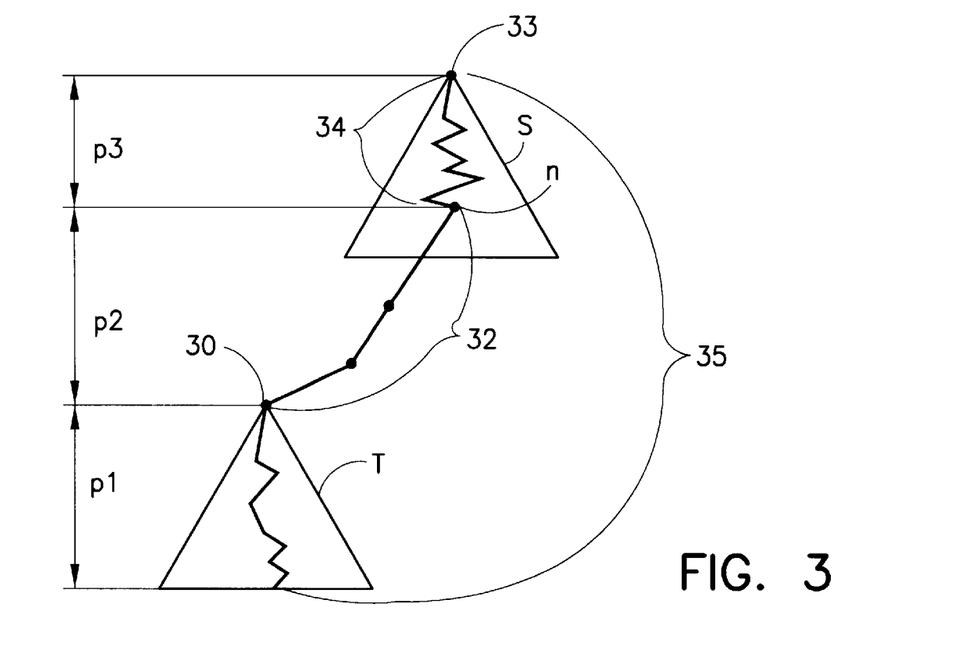
FIG. 3 illustrates the algorithm to find a feasible path to connect trees.

We disclose one method that can be used to find the feasible paths that can be used to connect a disconnected tree to the tree containing the tree leader. FIG. 3 is used to illustrate the algorithm.

Referring to FIG. 3, let S be the tree containing the leader node 33. Let T be a tree not containing the leader, that we wish to join to subtree S. Starting from the root 33 of tree T, paths of increasing hop-count to any node in the network are considered. Paths of increasing hop count that terminate at nodes that are not members of a subtree are discarded. For example, all paths of hop count one from the root of tree T are considered. Those paths terminating at nodes that are not members of tree S are discarded. In the next step, paths of length two are considered. Those paths terminating at nodes that are not members of tree S are discarded, and so on. If the path reaches a node n in tree S, the path is examined to verify that it still meets the parametric constraints of the multipoint communication channel. For example, path 32 of hop count three connects root 30 to node n of S. The path is determined to meet the parametric constraints if the following condition is met:

$$\rho < \rho 1 \oplus \rho 2 \oplus \rho 3,$$

where ρ1 is the parametric residue of the tree T, ρ2 is the parametric characteristic of the path 32 from node n to the root 30 of T, ρ3 is the parametric limit of node n with respect to tree S, and ρ is the overall parametric constraint for the multipoint communication channel. FIG. 3 shows the parametric residue in tree T, the parametric characteristics ρ2 of the path 32 from the selected node n in the leader tree S to the root node 30 of T, and the parametric limit of the path 34 from the leader node 33 in tree S to the selected node n in the leader tree S.

If the path meets the overall parametric constraints required for the multipoint communications channel, then the trees T and S are joined together by means of the computed path. The root of S is the root of the combined tree. If no such path is found with a hop count equaling the number of nodes in the network, then no feasible path meeting the parametric constraints exists in the network.

If no parametric constraints are specified for the multipoint communication channel, then a feasible path is found if a path from the root of tree T to a node n in tree S. If no such path is found with a hop count equaling the number of nodes in the network, then no feasible path exists in the network.

EXAMPLE OF THE RECONFIGURATION ALGORITHM

Figure 4:
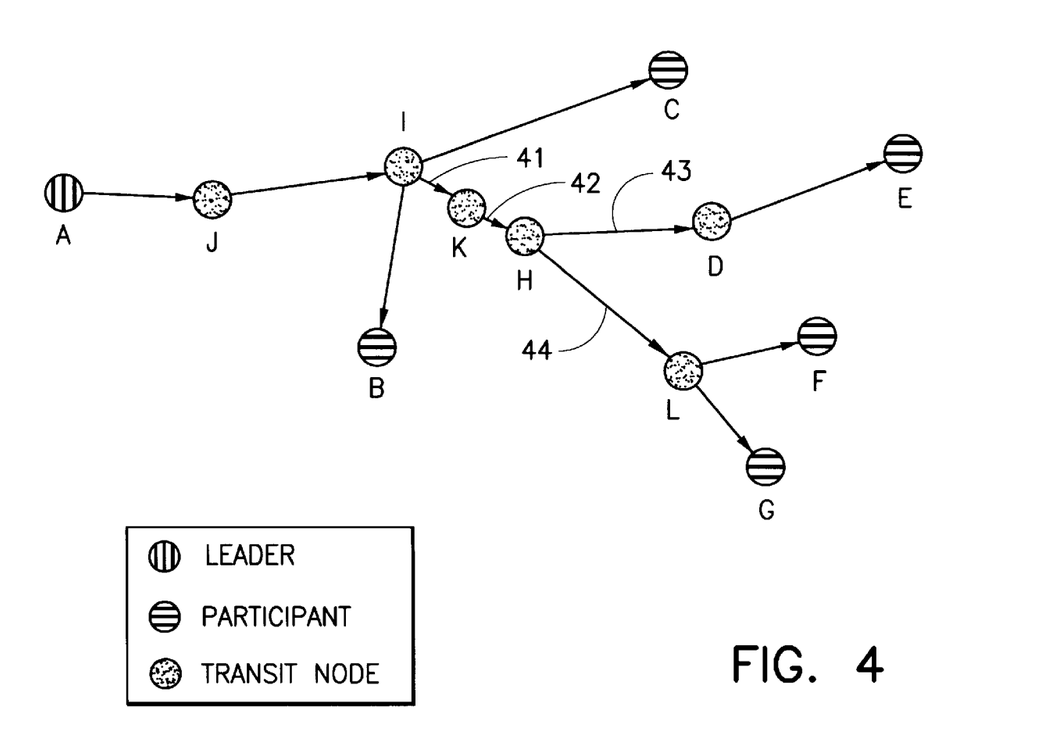
FIG. 4 shows a multipoint communication channel in a communication network. Different shades of circles are used to demonstrate the different kind of nodes in the multipoint communication channel.
Figure 5:
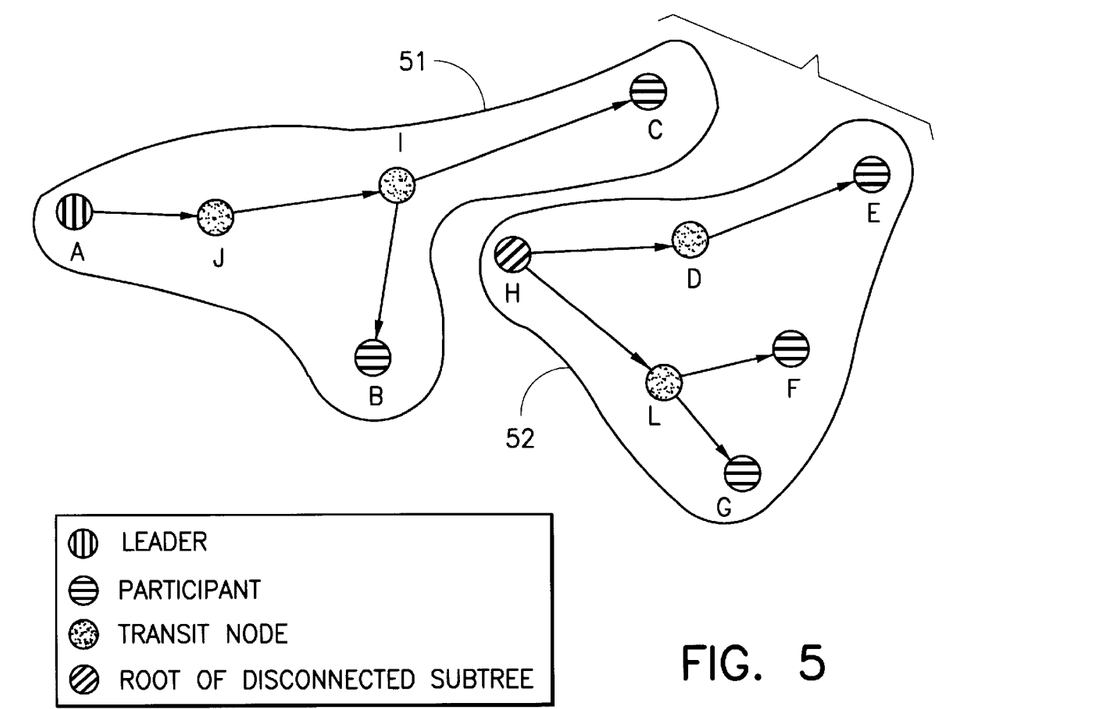
FIG. 5 shows the resulting disconnected subtrees when the multipoint communication channel in FIG. 4 experiences a failure at link between K and H.

We illustrate the tree recomputation process by means of an example. FIG. 4 shows a multipoint communication channel between leader A and participants B, C, E, F and G. Nodes J, I, K, H, D and L are transit nodes. If the link between K and H were to fail, two subtrees would be created, as shown in FIG. 5. One subtree 51 consists of nodes A, J, I, B and C. The other subtree 52 consists of nodes H, D, L, E, F and G. Note that the leaf node K is not a participant node in the subtree containing the leader, and has been removed as part of the trimming process, as described in step (1) of the tree recomputation algorithm.

Figure 6:
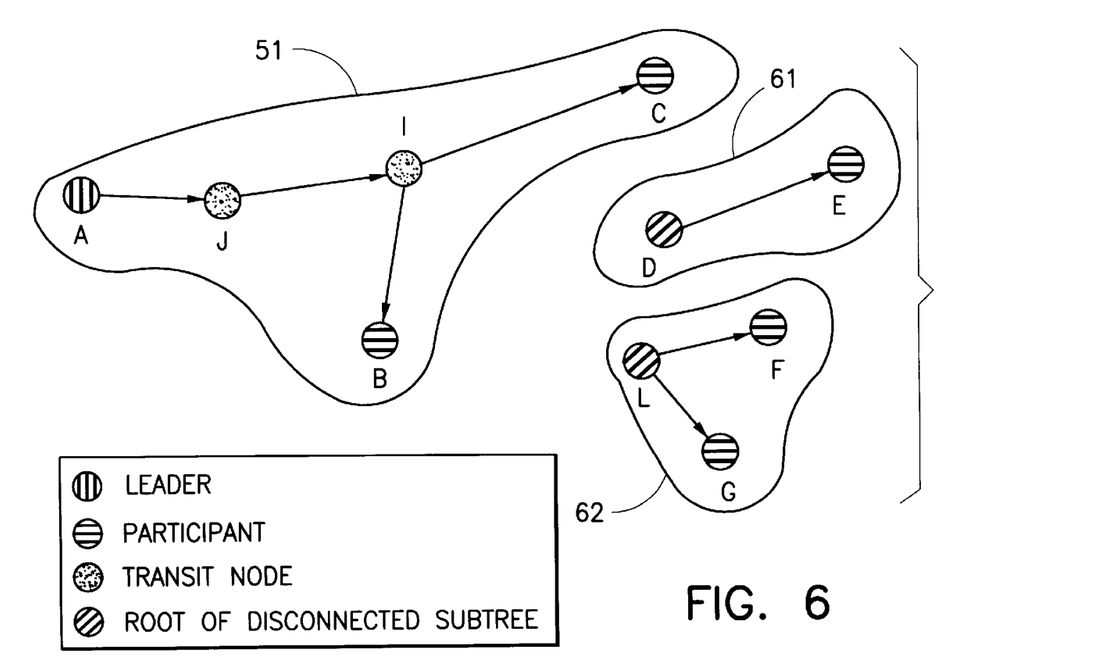
FIG. 6 shows the result of reconfiguration process when no feasible path is found from the leader subtree to the disconnected subtree shown in FIG. 5.

Suppose one can not find a feasible path satisfying the parametric constraints from the tree containing A to the root H of the disconnected subtree containing H, D, L, E, F and G. In this case, the subtree containing nodes H, D, L, E, F and G is broken into two subtrees 61 and 62, one subtree 61 containing nodes D and E, and the other subtree 62 containing nodes L, F and G, as shown in FIG. 6. The algorithm then attempts to link D, the root node of the subtree 61, and L, the root node of the subtree 62 containing nodes L, F and G, to a node in the tree 51 containing A. Node H is removed from the multipoint communication channel.

Figure 7:
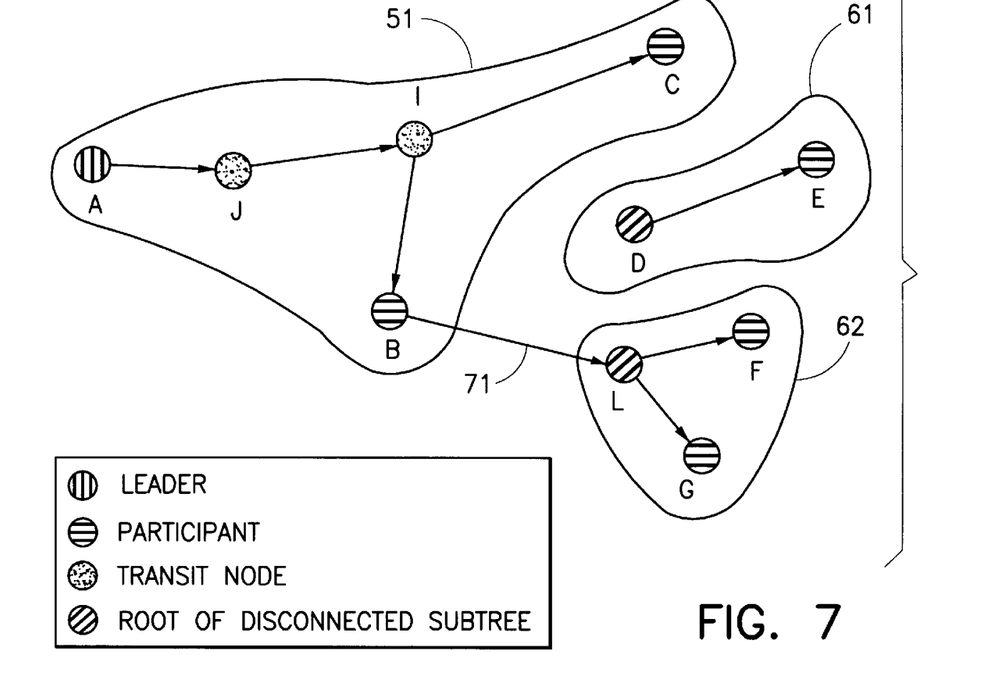
FIG. 7 shows the result of reconfiguration process when one of the disconnected subtrees in FIG. 6 is joined to the leader subtree.

In the next step of the algorithm, assume that a feasible path satisfying the parametric constraints was found consisting of a link between B and L. The root node of the subtree 62 is joined to node B in the tree 51 by means of the feasible path 71. The resulting set of trees is shown in FIG. 7. In the next step, tree 61 is merged to the tree 51 rooted at A by means of the path 81 consisting of link from I to D. The final resulting tree from the reconfiguration is shown in FIG. 8.

Figure 8:
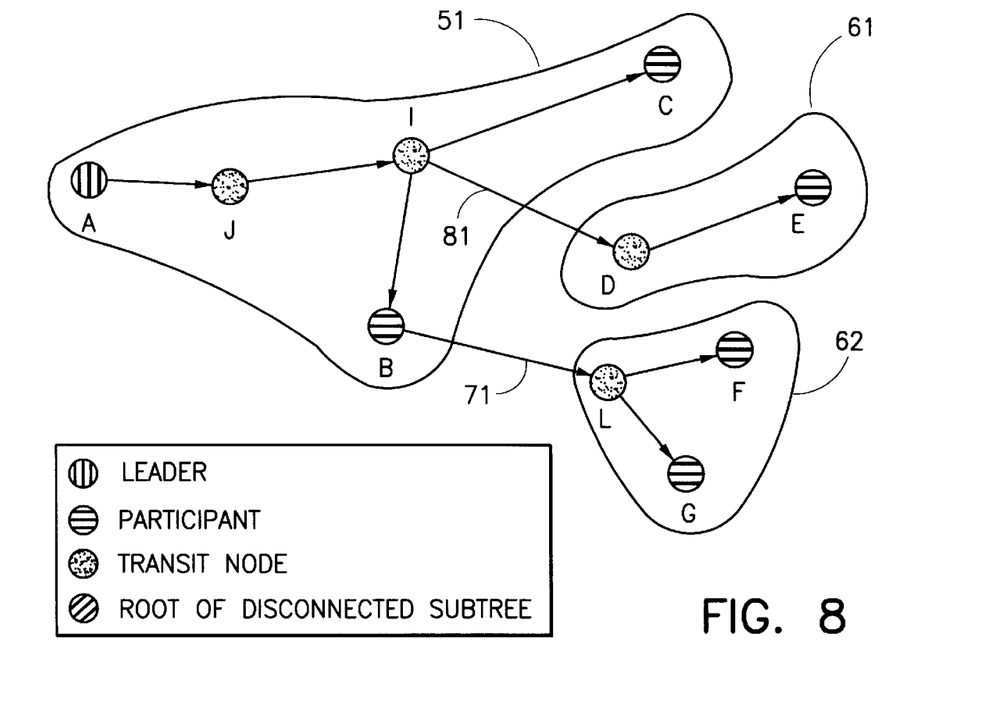
FIG. 8 shows the result of the reconfiguration process after the disconnected subtree in FIG. 7 is joined to the leader subtree. This is also the final subtree.

Comparing the trees in FIG. 4 and FIG. 8, one can determine that resources need to be acquired, link 71 and 81, while resources need to be released on links 41, 43–44 of FIG. 4, (I-K), (H-D), and (H-L) and nodes K and H. Note that resources on link 42 (K-H) would automatically be released as a result of link failure.

AVOIDING CYCLES DURING RECONFIGURATION

Figure 9:
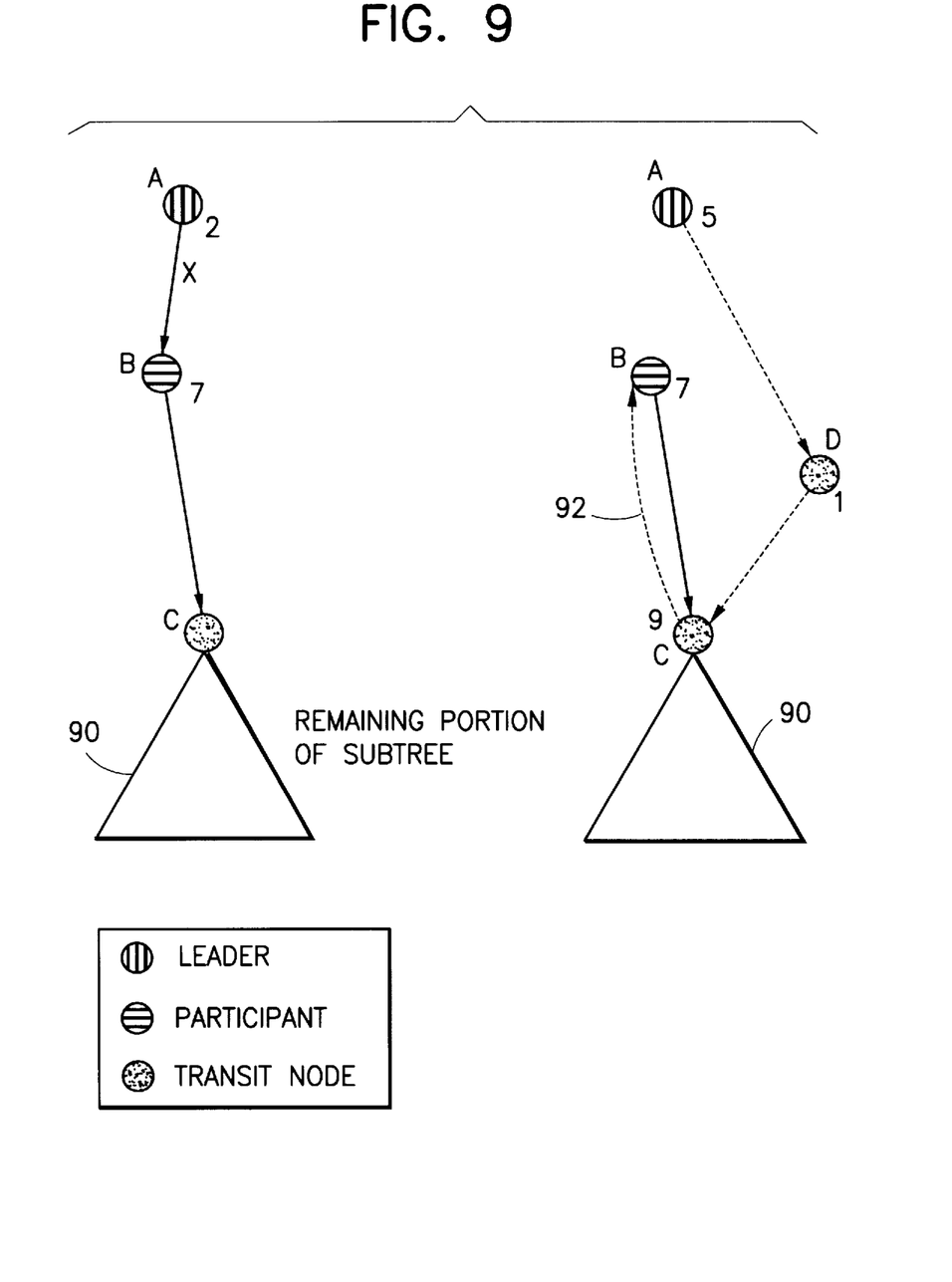
FIG. 9 shows one case where cycles may be formed in the multipoint communication channel during the reconfiguration process.

In the last step of the reconfiguration algorithm, the leader sends connection establishment request messages on all the paths where resources need to be acquired. Unless precautions are taken, a cycle could form in the connection under certain race-conditions. For example, FIG. 9 illustrates a case in which during automatic reconfiguration of the multipoint communication channel, a cycle in connection forms. Assume that participant nodes A, B and C are involved in a multipoint communication channel where A is the leader. Assume that the link between nodes A and B fails. Node A initiates the reconfiguration process. Assume that the new path to node B includes links A-D, D-C, C-B. The message sent by the leader to add link C-B (92) to the tree 90 may arrive at node C and be processed before the message sent by the leader to take-down link B-C arrives at node B. This can cause formation of a cycle between B and C in the multipoint communication channel.

In order to prevent cycles during the multipoint communication channel reconfiguration process, messages to acquire network resources can include a list of link identifiers that must be reclaimed prior to accepting the new connection establishment request. Since the leader has the current multipoint communication channel configuration as well as the new multipoint communication channel configuration, it can determine which network nodes along the newly added path have links that must be reclaimed.

In FIG. 9, the message sent by the leader to acquire resources would identify the link B-C to be reclaimed at the node B. Thus, prior to accepting the new connection establishment request, node B would reclaim the resources on the link to C, preventing the formation of a cycle in the multipoint communication channel.

In some cases, explicit take-down of a network resource is not feasible because the leader may be partitioned from the a portion of a multipoint communication channel. In that case, the leader can maintain, for a specified time-out period, information about network resources it failed to explicitly recover. The intermediate nodes implicitly reclaim resources assigned to a communication channel if no liveness message is received from the leader within this time-out period. The leader periodically sends liveness messages to reassert the continued maintenance of the tree. If the leader is asked to extend the tree during this time-out period, the set of paths which require explicit take-down (but are not yet reclaimed) is compared with the new extensions being requested, and the request is denied if the possibility of a cycle is detected.

SAMPLE IMPLEMENTATION

The invention can be implemented within the context of IBM's Broadband Network Services (NBBS). The NBBS multipoint network services consist of several coordinating components that establish, maintain, extend, trim and take-down multipoint connections. The disclosed invention is used to provide automatic reconfiguration for multipoint communication channels in NBBS networks. In NBBS, automatic reconfiguration is called Non-Disruptive Path Switching (NDPS). The NBBS the network architecture is described in [2]

In an NBBS network, the first node to participate in a multipoint communication channel is elected as the leader for that channel. Each node in the network has a replicated database showing the current network topology. NBBS provides mechanisms to ensure that state information about link and node failures, and link bandwidth utilization, in the network is propagated rapidly and reliably to all nodes. The NBBS control component managing multipoint connections is called the CA (Connection Agent).

One feature provided by NBBS is Linear Multicast (LM). LM allows packets to be sent on a linear path, and selectively drops a copy of the packet to any subset of the nodes along the path. Thus, a packet can be delivered to several recipients in a single transmission. NBBS mechanisms support both reliable and unreliable LM transmissions. In reliable transmission, the packet is reliably delivered to the selected nodes along the linear path. That is, retransmissions of the packet are carried-out to selected nodes that failed to receive the first packet transmission.

In the NBBS multipoint model, NDPS is centrally controlled by the CA at the leader, also called the OCA (Origin Connection Agent). When a failure occurs, the topology of the multipoint communication channel is divided into two or more trees, one containing the leader, and the others containing the detached participant nodes.

NDPS is triggered by the notification that a link or node along the multipoint communication channel has failed. When NDPS is triggered, the OCA performs the following actions:

The OCA uses the list of failed links and/or nodes, the current topology of the multipoint communication channel, the QOC and bandwidth requirements of the multipoint communication channel, and executes the algorithm specified in this invention to compute a new tree topology for the multipoint communication channel. The new tree specifies the optimal topology that re-attaches the disconnected trees, given the QOS and bandwidth constraints.

The OCA compares the new tree topology with the existing tree topology to calculate two sets of LM paths, P1 and P2. The first set of LM paths (P1) consist of the connection establishment portion which will be used to reconnect the leader's tree with the disconnected tree(s). The second set of LM paths (P2) is used to explicitly reclaim resources on the network nodes that no longer participate in the connection.

The OCA sends a connection establishment request message on all LM paths in P1. In parallel, the OCA send a take-down message on all the LM paths in P2. If the OCA detects the feasibility of a cycle, it includes information in the connection establishment message to reclaim network resources, as described in the section "Avoiding Cycles During Reconfiguration" so as to prevent the formation of a cycle during the reconfiguration process.

If some of the links are not reachable due to network partitions, the OCA may not be able to explicitly take-down resources on those links. In that case, the OCA maintains a list of unreachable links for a specified time-out period. The time-out period is chosen to be long enough so that NBBS liveliness mechanisms ensure that the resources on unreachable links are released. NBBS requires that the leader send out a liveliness message at regular intervals. If any node participating in the multipoint communication channel does not receive a liveliness message in a specified liveliness time-out interval, the node implicitly releases all resources reserved for that multipoint communication channel. Thus, the time-out period for maintaining a list of these links needs to be greater than the liveliness time-out interval in the network. When a communication channel is being extended, or re-routed, the set of links in this list maintained by the OCA for the multipoint communication channel are considered ineligible for inclusion in the multipoint communication channel. This ensures that no link, which is unreachable temporarily, and becomes reachable once again, forms a cycle because it had an older branch of the multipoint communication channel traversing it.

References [1,2,3] are herein incorporated by reference.

REFERENCES

[1] Braden, R., Zhang, L., Estrin, D., Herzog, S., Jamin, S., Resource ReSerVation Protocol (RSVP)—Version 1 Functional Specification. Internet draft-ietf-rsvp-spec-06.ps, June, 1995.

[2] Networking BroadBand Services (NBBS) Architecture Tutorial. Document Number GG244486-00. International Technical Support Organization, Raleigh Center, June 1995.

[3] ATM Forum 94-0471R12 PNNI Draft Specification. ATM Forum. September, 1995.

Having thus described our invention, what we claim as new and desire to secure by Letters Patents is:

1. In a communication network having a plurality of connected nodes, and a multi-point communication channel, logically represented by a tree comprising a root node from which messages are transmitted along path toward leaf nodes of the tree, interconnecting at least selected ones of said nodes, one of said selected nodes being a leader, where said leader is the root node of said tree logically representing said multipoint communication channel, a method of reconfiguring said multipoint communication channel when one or more of said selected nodes becomes disconnected from said multipoint communication channel, resulting in said multipoint communication channel being partitioned into a parent subtree and one or more disconnected subtrees, where said parent subtree comprises said leader and where each disconnected sub-tree contains a subtree root node, said method comprising:

a) selecting and establishing a path between a node of said parent subtree and the subtree root node of each disconnected subtree not containing said leader, and;

b) when no path exists between said parent subtree and a subtree root node of any said disconnected subtree, removing said subtree root node to partition said disconnected subtree into additional disconnected subtrees, and repeating steps (a) through (b), whereby all paths selected in step (a), all disconnected subtrees to which a path was successfully selected and established in step (a) and the parent subtree containing the leader, form a reconfigured tree of said multipoint communication channel.

2. A method as set forth in claim 1, wherein removal of subtree root nodes and establishment of paths in said multipoint communication channel are carried out in parallel.

3. A method as set forth in claim 1, wherein said paths are established in step (a) by transmitting information in messages to acquire network elements, to indicate no longer used network elements that must be reclaimed prior to adding said network elements, in the event that by adding said new network elements prior to the reclaiming said no longer used network elements could cause a cycle to be formed in said multipoint communication channel, and prior to adding a new network element of said new network elements at a given node, reclaiming those of said network elements that are no longer required at said node that could cause a cycle to be formed in said multipoint communication channel.

4. A method as set forth in claim 1, wherein cycles are avoided in multiple reconfigurations of the multipoint communication channel comprising the steps of i) maintaining an existing state of any network elements which could not be explicitly reclaimed by the leader for the duration of a liveness time-out interval, and ii) avoiding the latter elements in a subsequent modifications of the multipoint communication channel, wherein the liveness time-out interval is the interval of time for which a network element is implicitly reclaimed because a liveness message is not received from the leader within said pre-specified liveness time-out interval.

5. A method as set forth in claim 1, wherein said multipoint communication channel is constrained by parametric constraints from the leader to any participant nodes, and wherein only paths satisfying said parametric constraints are included in said reconfigured tree of said multipoint communication channel.

6. A method as set forth in claim 5, wherein the parametric constraints for said multipoint communication channel are selected to offer Quality of Service guarantees to said multipoint communication channel.

7. In a communication network having a plurality of connected nodes, and a multi-point communication channel, logically represented by a tree comprising a root node from which messages are transmitted along path toward leaf nodes of the tree, interconnecting at least selected ones of said nodes, one of said selected nodes being a leader, where said leader is the root node of said tree logically representing said multipoint communication channel, a method of reconfiguring said multipoint communication channel when one or more of said selected nodes becomes disconnected from said multipoint communication channel, resulting in said multipoint communication channel being partitioned into a parent subtree and one or more disconnected subtrees, where said parent subtree comprises said leader and where each disconnected sub-tree contains a subtree root node, said method comprising:

a) in the parent subtree, removing any leaf nodes that are not one of said selected nodes;

b) selecting and establishing a path between a node of said parent subtree and the the root node of each disconnected subtree that does not contain said leader, and;

c) when no path exists between said parent subtree and a subtree root node of any said disconnected subtree, removing said subtree root node to partition said disconnected subtree into additional disconnected subtrees, and then repeating steps (a) through (c), whereby all paths selected in step (b), all disconnected subtrees to which a path was successfully selected and established in step (b) and the parent subtree containing the leader after any leaf nodes are removed in step (a), form a reconfigured tree of said multipoint communication channel.

8. A method as set forth in claim 7, wherein removal of subtree root nodes and establishment of paths in said multipoint communication channel are carried out in parallel.

9. A method as set forth in claim 7, wherein said paths are established in step (a) by transmitting information in messages to acquire network elements, to indicate no longer used network elements that must be reclaimed prior to adding said network elements, in the event that by adding said new network elements prior to the reclaiming said no longer used network elements could cause a cycle to be formed in said multipoint communication channel, and prior to adding a new network element of said new network elements at a given node, reclaiming those of said network elements that are no longer required at said node that could cause a cycle to be formed in said multipoint communication channel.

10. A method as set forth in claim 7, wherein cycles are avoided in multiple reconfigurations of the multipoint communication channel comprising the steps of i) maintaining an existing state of any network elements which could not be explicitly reclaimed by the leader for the duration of a liveness time-out interval, and ii) avoiding the latter elements in a subsequent modifications of the multipoint communication channel, wherein the liveness time-out interval is the interval of time for which a network element is implicitly reclaimed because a liveness message is not received from the leader within said pre-specified liveness time-out interval.

11. A method as set forth in claim 7, wherein said multipoint communication channel is constrained by parametric constraints from the leader to any participant nodes, and wherein only paths satisfying said parametric constraints are included in said reconfigured tree of said multipoint communication channel.

12. A method as set forth in claim 11, wherein the parametric constraints for said multipoint communication channel are selected to offer Quality of Service guarantees to said multipoint communication channel.

* * * * *